United States Patent
Ito et al.

(10) Patent No.: US 11,433,888 B2
(45) Date of Patent: Sep. 6, 2022

(54) DRIVING SUPPORT SYSTEM

(71) Applicants: TOYOTA JIDOSHA KABUSHIKI KAISHA, Toyota (JP); DENSO CORPORATION, Kariya (JP)

(72) Inventors: Shogo Ito, Susono (JP); Kohei Tochigi, Shizuoka-ken (JP); Yuta Ikezawa, Susono (JP); Norio Tsuchida, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 69 days.

(21) Appl. No.: 16/992,739

(22) Filed: Aug. 13, 2020

(65) Prior Publication Data

US 2021/0171032 A1 Jun. 10, 2021

(30) Foreign Application Priority Data

Dec. 5, 2019 (JP) ............................. JP2019-220149

(51) Int. Cl.
 *B60W 30/16* (2020.01)
 *G06V 20/58* (2022.01)
(52) U.S. Cl.
 CPC ........... *B60W 30/16* (2013.01); *G06V 20/584* (2022.01); *B60W 2420/42* (2013.01); *B60W 2554/80* (2020.02); *B60W 2555/60* (2020.02)
(58) Field of Classification Search
 CPC ......... B60W 2420/42; B60W 2554/80; B60W 2555/60; B60W 2556/20; B60W 30/09;
 (Continued)

(56) References Cited

U.S. PATENT DOCUMENTS 5,648,905 A * 7/1997 Izumi .................... G01S 13/931
 701/301
6,473,681 B1 10/2002 Eckert et al.
 (Continued)

FOREIGN PATENT DOCUMENTS

JP 2005-063398 A 3/2005
JP 2007-087336 A 4/2007
 (Continued)

OTHER PUBLICATIONS

U.S. Appl. No. 16/007,030, filed Jun. 13, 2018.
Notice of Allowance issued to U.S. Appl. No. 16/007,030 dated Nov. 15, 2019.

*Primary Examiner* — Babar Sarwar
(74) *Attorney, Agent, or Firm* — Sughrue Mion, PLLC (57) ABSTRACT

A driving support system detects a deceleration object ahead and starts deceleration assistance for a host vehicle. The driving support system includes a reliability calculation unit configured to calculate a reliability of detection of the deceleration object, an assistance mode selection unit configured to select an assistance mode of the deceleration assistance from among multiple assistance modes in accordance with the calculated reliability of detection, and a driving support unit configured to perform the deceleration assistance in the selected assistance mode. The assistance mode selection unit is configured to select a first assistance mode when the reliability of detection is lower than a predetermined reliability threshold and select a second assistance mode higher in a level of the deceleration assistance than the first assistance mode when the reliability of detection is higher than or equal to the reliability threshold.

6 Claims, 4 Drawing Sheets

(58) Field of Classification Search
CPC .............. B60W 30/16; B60W 30/17; B60W 30/18109; G06K 9/00825; G06K 9/6202
See application file for complete search history.

(56) References Cited

U.S. PATENT DOCUMENTS

| | | | |
|---|---|---|---|
| 10,597,013 B2 * | 3/2020 | Adachi | G06K 9/00818 |
| 2006/0195231 A1 | 8/2006 | Diebold et al. | |
| 2010/0023226 A1 * | 1/2010 | Ito | B60W 30/09 |
| | | | 701/46 |
| 2010/0082252 A1 * | 4/2010 | Asanuma | G08G 1/005 |
| | | | 701/301 |
| 2010/0121549 A1 * | 5/2010 | Fukuda | B60W 30/188 |
| | | | 701/93 |
| 2014/0343750 A1 * | 11/2014 | Minemura | B60W 50/04 |
| | | | 701/1 |
| 2015/0175160 A1 * | 6/2015 | Sudou | B60W 30/09 |
| | | | 701/70 |
| 2017/0015328 A1 | 1/2017 | Oguri | |
| 2017/0297547 A1 * | 10/2017 | Goto | B60T 7/12 |
| 2018/0356218 A1 * | 12/2018 | Omachi | G01C 9/06 |
| 2019/0031163 A1 | 1/2019 | Adachi et al. | |

FOREIGN PATENT DOCUMENTS

| | | |
|---|---|---|
| JP | 2013-196639 A | 9/2013 |
| JP | 2013-218429 A | 10/2013 |
| JP | 2014-222462 A | 11/2014 |
| JP | 2016-122362 A | 7/2016 |
| WO | 2007/034314 A1 | 3/2007 |
| WO | 2016/158508 A1 | 10/2016 |

\* cited by examiner

DRIVING SUPPORT SYSTEM

CROSS-REFERENCE TO RELATED APPLICATION

This application claims priority to Japanese Patent Application No. 2019-220149 filed on Dec. 5, 2019, incorporated herein by reference in its entirety.

BACKGROUND

1. Technical Field

The disclosure relates to a driving support system.

2. Description of Related Art

Hitherto, Japanese Unexamined Patent Application Publication No. 2013-218429 (JP 2013-218429 A) is known as a technical document that relates to a driving support system. This publication describes that, when a driving support system performs deceleration assistance for a host vehicle, stops deceleration assistance when a distance to a deceleration object and the speed of the host vehicle satisfy predetermined conditions.

SUMMARY

For example, when a deceleration object ahead of the host vehicle is detected to perform deceleration assistance, the reliability of detection of a deceleration object varies depending on various factors. The above-described driving support system does not use the reliability of detection of a deceleration object at the time of performing deceleration assistance and performs deceleration assistance at the same level for different detection reliabilities. For this reason, for example, if such a driving support system performs deceleration assistance at the same level for cases where the reliability of detection of a deceleration object is low and the accuracy of detection of a deceleration object is poor although the reliability of detection of a deceleration object is high and a deceleration object is accurately detected, the driving support system may perform inappropriate deceleration assistance, that is, for example, the driving support system does not perform reliable deceleration assistance.

The disclosure describes a driving support system that is capable of performing appropriate deceleration assistance in consideration of the reliability of detection of a deceleration object.

An aspect of the disclosure relates to a driving support system. The driving support system detects a deceleration object ahead of a host vehicle and starts deceleration assistance for the host vehicle based on at least a distance between the detected deceleration object and the host vehicle. The driving support system includes a reliability calculation unit configured to calculate a reliability of detection of the deceleration object, an assistance mode selection unit configured to select an assistance mode of the deceleration assistance from among multiple assistance modes in accordance with the calculated reliability of detection, and a driving support unit configured to perform the deceleration assistance in the selected assistance mode. The multiple assistance modes include a first assistance mode and a second assistance mode greater in a level of the deceleration assistance than the first assistance mode. The assistance mode selection unit is configured to select the first assistance mode when the reliability of detection is lower than a predetermined reliability threshold and select the second assistance mode when the reliability of detection is higher than or equal to the reliability threshold.

The driving support system performs the deceleration assistance in the second assistance mode higher in the level of the deceleration assistance when the reliability of detection is higher than or equal to the reliability threshold, and performs the deceleration assistance in the first assistance mode lower in the level of the deceleration assistance when the reliability of detection is lower than the reliability threshold. In this way, the driving support system is capable of performing further reliable deceleration assistance higher in the level of the deceleration assistance when the reliability of detection is high. As described above, the driving support system is capable of performing appropriate deceleration assistance in consideration of the reliability of detection of a deceleration object.

In the driving support system, calculating the reliability of detection based on the positional relationship by the reliability calculation unit may include at least one of decreasing the reliability of detection as a distance from the host vehicle to the deceleration object extends and decreasing the reliability of detection as a deviation of a lateral position of the deceleration object relative to the host vehicle increases. In this case, the driving support system is capable of further appropriately calculating a reliability of detection in consideration of the detection capability of a sensor that detects a deceleration object.

In the driving support system, the reliability calculation unit may be configured to, when the deceleration object is a preceding vehicle, calculate the reliability of detection based on the positional relationship between the host vehicle and the deceleration object, and the reliability calculation unit may be configured to, when the deceleration object is a traffic light, calculate the reliability of detection based on an image recognition likelihood of the traffic light, recognized based on a captured image. For example, a preceding vehicle is running on a road ahead of the host vehicle, while a traffic light is provided on a road ahead of the host vehicle or provided at a roadside. Therefore, the driving support system calculates a reliability of detection based on the positional relationship between the host vehicle and the deceleration object when the deceleration object is a preceding vehicle and calculates a reliability of detection based on an image recognition likelihood when the deceleration object is a traffic light. Therefore, the driving support system is capable of further appropriately calculating the reliability of detection in accordance with a type of deceleration object.

According to the aspect of the disclosure, it is possible to perform appropriate deceleration assistance in consideration of the reliability of detection of a deceleration object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an exemplary embodiment will be described with reference to the accompanying drawings. In the following description, like reference signs denote the identical or corresponding elements, and the description thereof will not be repeated.

Figure 1:
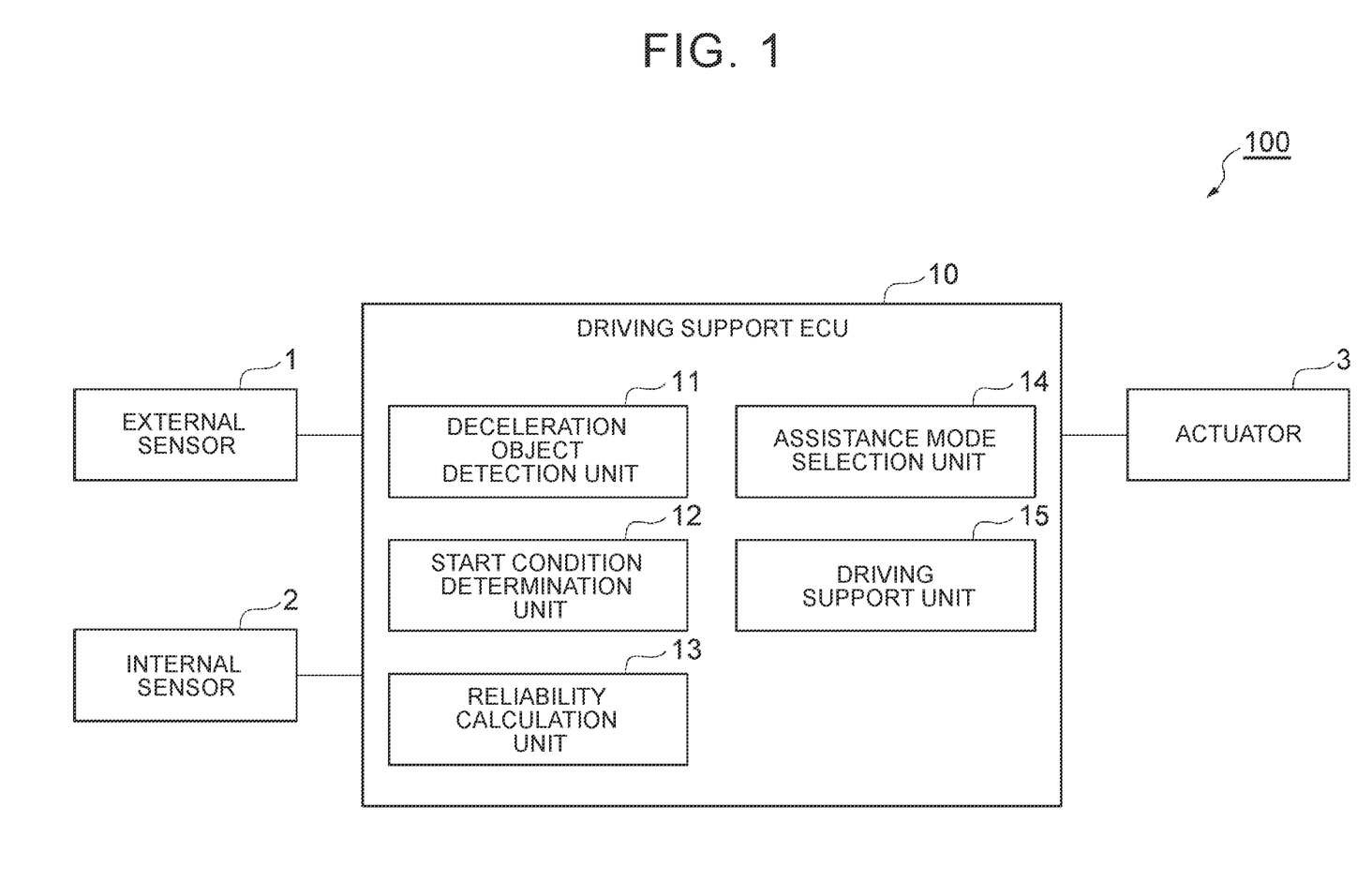
FIG. 1 is a block diagram showing an example of the configuration of a driving support system according to an embodiment.

As shown in FIG. 1, the driving support system 100 is installed in a vehicle (host vehicle), such as a passenger automobile, and supports a driver to drive the host vehicle. The driving support system 100 performs deceleration assistance for the host vehicle under predetermined conditions when the driving support system 100 detects a deceleration object, such as a preceding vehicle and a traffic light, ahead of the host vehicle. Deceleration objects are objects that cause deceleration assistance. Deceleration objects include preceding vehicles, traffic lights, and stop lines. Deceleration objects may include moving objects, such as pedestrians and bicycles, other than preceding vehicles, and may also include stationary objects, such as signs such as stop signs, crosswalks, fallen objects, construction setups, and structures, other than traffic lights or stop lines. Deceleration objects may include road curves. Deceleration objects may include only red or yellow traffic lights and do not need to include green traffic lights.

Deceleration assistance is driving support that causes the host vehicle to decelerate to a preset target speed. The target speed is not limited and may be 0 km/h or may be 10 km/h. A target speed may be determined according to a type of deceleration object. When the deceleration object is a traffic light, the target speed of deceleration assistance may be changed according to the status of the traffic light (status such as green light, yellow light, and red light). A target speed is not limited to the speed of the host vehicle and may be a relative speed between the host vehicle and a deceleration object.

Configuration of Driving Support System

Hereinafter, the configuration of the driving support system 100 will be described with reference to the accompanying drawings. As shown in FIG. 1, the driving support system 100 includes a driving support electronic control unit (ECU) 10 that generally manages the system. The driving support ECU 10 is an electronic control unit including a central processing unit (CPU), read-only memory (ROM), random access memory (RAM), and the like. In the driving support ECU 10, for example, a program stored in the ROM is loaded onto the RAM, and the CPU runs the program loaded on the RAM. Thus, various functions are implemented. The driving support ECU 10 may be made up of multiple electronic control units.

The driving support ECU 10 is connected to an external sensor 1, an internal sensor 2, and an actuator 3.

The external sensor 1 is a detector that detects a situation around the host vehicle. Of a camera and a radar sensor, the external sensor 1 includes at least the camera.

The camera is an imaging device that captures the image of a situation outside the host vehicle. The camera is provided on, for example, the back side of a windshield of the host vehicle and captures an image ahead of the host vehicle. The camera transmits captured information on the situation outside the host vehicle to the driving support ECU 10. The camera may be a monocular camera or a stereo camera.

The radar sensor is a detector that detects an object around the host vehicle by using radio waves (for example, millimeter waves) or light. Examples of the radar sensor include millimeter wave radar and light detection and ranging (LIDAR). The radar sensor transmits radio waves or light to an area around the host vehicle and receives radio waves or light reflected by objects. Thus, the radar sensor detects objects. The radar sensor transmits detected object information to the driving support ECU 10. Objects include not only fixed obstacles, such as guard rails and buildings, but also movable obstacles, such as pedestrians, bicycles, and other vehicles.

The internal sensor 2 is a detector that detects the running status of the host vehicle. The internal sensor 2 includes a vehicle speed sensor, an acceleration sensor, and a yaw rate sensor. The vehicle speed sensor is a detector that detects the speed of the host vehicle. The vehicle speed sensor is, for example, a wheel speed sensor. The wheel speed sensor is provided on each wheel of the host vehicle or a drive shaft or the like that rotates integrally with each wheel, and detects the rotation speed of each wheel. The vehicle speed sensor transmits detected vehicle speed information (wheel speed information) to the driving support ECU 10.

The acceleration sensor is a detector that detects the acceleration of the host vehicle. The acceleration sensor includes, for example, a longitudinal acceleration sensor and a lateral acceleration sensor. The longitudinal acceleration sensor detects the acceleration of the host vehicle in a front-rear direction. The lateral acceleration sensor detects the lateral acceleration of the host vehicle. The acceleration sensor transmits, for example, information on the acceleration of the host vehicle to the driving support ECU 10. The yaw rate sensor is a detector that detects a yaw rate (rotation angular velocity) about the vertical axis at the center of gravity of the host vehicle. The yaw rate sensor may be, for example, a gyro sensor. The yaw rate sensor transmits information on the detected yaw rate of the host vehicle to the driving support ECU 10.

The actuator 3 is a device that is used to control the host vehicle. The actuator 3 includes at least a drive actuator and a brake actuator. The actuator 3 may include a steering actuator. The drive actuator controls the amount of air supplied to an engine (throttle opening degree) in response to a control signal from the driving support ECU 10 and controls the driving force of the host vehicle. When the host vehicle is a hybrid vehicle, a control signal from the driving support ECU 10 is input to a motor that serves as a power source and the driving force is controlled, in addition to control over the amount of air supplied to the engine. When the host vehicle is an electric vehicle, a control signal from the driving support ECU 10 is input to a motor that serves as a power source, and the driving force is controlled. The motor that serves as a power source in these cases is a component of the actuator 3.

The brake actuator controls a brake system in response to a control signal from the driving support ECU 10 and controls braking force that is applied to the wheels of the host vehicle. The brake system may be, for example, a hydraulic brake system. The steering actuator controls an assist motor within an electric power steering system in response to a control signal from the driving support ECU 10. The assist motor controls steering torque. Thus, the steering actuator controls the steering torque of the host vehicle.

Next, the functional configuration of the driving support ECU 10 will be described. As shown in FIG. 1, the driving support ECU 10 includes a deceleration object detection unit 11, a start condition determination unit 12, a reliability calculation unit 13, an assistance mode selection unit 14, and a driving support unit 15. Part of the functions of the driving support ECU 10, which will be described below, may be executed on a server that communicates with the host vehicle.

The deceleration object detection unit 11 detects a deceleration object ahead of the host vehicle based on information detected by the external sensor 1. Detecting a deceleration object by the deceleration object detection unit 11 includes recognizing a type of deceleration object (type, such as a preceding vehicle and a traffic light). The deceleration object detection unit 11 detects a deceleration object and recognizes a type of deceleration object by, for example, performing pattern matching using a prestored image pattern for each type based on an image ahead of the host vehicle, captured by the camera. The deceleration object detection unit 11 may recognize a type of deceleration object based on object information from the radar sensor.

Detecting a deceleration object by the deceleration object detection unit 11 includes recognizing a relative situation between the host vehicle and the deceleration object.

A relative situation includes at least a distance between the host vehicle and a deceleration object (a distance in the front-rear direction or the direction of travel of the host vehicle). A relative situation may include a relative speed between the host vehicle and a deceleration object. Specifically, the deceleration object detection unit 11 recognizes a relative situation between the host vehicle and a deceleration object based on, for example, information detected by the external sensor 1. When the deceleration object is a vehicle that is capable of performing inter-vehicle communication with the host vehicle, the deceleration object detection unit 11 may recognize a relative situation between the host vehicle and the deceleration object by using information acquired through inter-vehicle communication. The deceleration object detection unit 11 may recognize a relative speed between the host vehicle and a deceleration object based on, for example, the speed of the deceleration object, acquired through inter-vehicle communication, and the speed of the host vehicle.

The deceleration object detection unit 11 recognizes a positional relationship between the host vehicle and a deceleration object as a relative situation. A positional relationship between the host vehicle and a deceleration object includes a distance between the host vehicle and a deceleration object and a deviation in the lateral position of a deceleration object relative to the host vehicle. A lateral position is a position in a vehicle width direction of the host vehicle. A deviation in the lateral position of a deceleration object relative to the host vehicle is a deviation in the lateral direction (the vehicle width direction of the host vehicle) between a reference position of the host vehicle and a reference position of a deceleration object. A reference position of the host vehicle may be, for example, the center position of the host vehicle or a position at which the external sensor 1 (the camera, the radar sensor, or the like) is mounted in the host vehicle. A reference position of a deceleration object may be, for example, a position at the left-side end of a deceleration object when the deceleration object is located to the right as viewed from the host vehicle or a position at the right-side end of a deceleration object when the deceleration object is located to the left as viewed from the host vehicle. A reference position of a deceleration object may be the center position of a deceleration object.

The start condition determination unit 12 determines whether a deceleration assistance start condition for a deceleration object is satisfied. A deceleration assistance start condition is a condition set in advance to be used in determining whether to start deceleration assistance. The start condition determination unit 12 determines whether the deceleration assistance start condition is satisfied based on at least a distance between the host vehicle and a deceleration object.

The deceleration assistance start condition is changed according to a type of deceleration object. For example, when the type of deceleration object is a preceding vehicle, the start condition determination unit 12 determines whether the deceleration assistance start condition for a preceding vehicle is satisfied based on a relative situation between the host vehicle and the deceleration object.

Specifically, the start condition determination unit 12 determines that the deceleration assistance start condition for a preceding vehicle is satisfied when the speed of the host vehicle is higher than the speed of a preceding vehicle (the relative speed is positive in an approaching direction) and a time to collision (TTC) between the host vehicle and the preceding vehicle is shorter than a TTC threshold. A TTC is obtained by dividing a distance between the host vehicle and a deceleration object (preceding vehicle) by a relative speed (approaching speed) between the host vehicle and the deceleration object. The TTC threshold is a threshold value set in advance. Hereinafter, a threshold used in the description means a threshold value set in advance.

The start condition determination unit 12 may determine that the deceleration assistance start condition for a preceding vehicle is satisfied when a time headway (THW) obtained by dividing a distance between the host vehicle and a preceding vehicle by the speed of the host vehicle becomes shorter than a THW threshold, instead of a TTC. The start condition determination unit 12 may determine that the deceleration assistance start condition for a preceding vehicle is satisfied when a distance between the host vehicle and a preceding vehicle, instead of a TTC, becomes shorter than a distance threshold.

The start condition determination unit 12 may determine that the deceleration assistance start condition for a preceding vehicle is satisfied when the speed of the host vehicle is higher than the speed of a preceding vehicle and a required deceleration of the host vehicle is higher than or equal to a deceleration threshold. A required deceleration may be, for example, a deceleration required to avoid a situation in which a distance between the host vehicle and a preceding vehicle becomes shorter than a threshold set in advance for each speed. A required deceleration may be a deceleration required to avoid a situation in which a distance between the host vehicle and a preceding vehicle becomes shorter than a set value.

When the type of deceleration object is a stop line (stationary object), the start condition determination unit 12 determines whether a deceleration assistance start condition for a stop line is satisfied based on the speed of the host vehicle, detected by the internal sensor 2 (vehicle speed sensor), and a relative situation between the host vehicle and a stop line.

Specifically, the start condition determination unit 12 may determine that the deceleration assistance start condition for a stop line is satisfied when the speed of the host vehicle is higher than or equal to an assistance start speed threshold and a TTC between the host vehicle and a stop line is shorter than a TTC threshold. A TTC in this case corresponds to a time of arrival that the host vehicle takes to the stop line. The start condition determination unit 12 may determine that the deceleration assistance start condition for a preceding vehicle is satisfied when a distance between the host vehicle and a stop line is shorter than a distance threshold, instead of a TTC.

The start condition determination unit 12 may determine that the deceleration assistance start condition for a stop line is satisfied when the speed of the host vehicle is higher than or equal to an assistance start speed threshold and a required deceleration of the host vehicle is higher than or equal to a deceleration threshold. A required deceleration in this case is, for example, a deceleration required for the host vehicle to stop at the position of a stop line. A TTC threshold, a distance threshold, and a deceleration threshold each may be a value that varies according to a type of deceleration object.

When the type of deceleration object is a traffic light, the start condition determination unit 12 performs determination as to the deceleration assistance start condition by using a stop line just before a traffic light as an object. When the type of deceleration object is a traffic light and a stop line just before the traffic light is not detected by the external sensor 1 because of abrasion or the like of a white line of the stop line, the start condition determination unit 12 performs determination as to the deceleration assistance start condition on the assumption that a stop line is present at a position a set distance before the traffic light. Determination as to the deceleration assistance start condition by using a stop line may be applied when the type of deceleration object is a stationary object.

The reliability calculation unit 13 calculates the reliability of detection of a deceleration object. The reliability of detection indicates a likelihood of information of a deceleration object (a type of deceleration object, and a relative situation between the host vehicle and a deceleration object) detected (recognized) by the deceleration object detection unit 11. In the present embodiment, the reliability calculation unit 13 is, for example, capable of calculating the reliability of detection of a deceleration object by using at least any one of the following detection reliability calculation method 1, detection reliability calculation method 2, and detection reliability calculation method 3.

Detection Reliability Calculation Method 1

As the detection reliability calculation method 1, the reliability calculation unit 13 is capable of calculating a reliability of detection based on a positional relationship between the host vehicle and a deceleration object. Depending on the detection capability of the external sensor 1 that detects a deceleration object, the reliability of detection of a deceleration object decreases as a distance from the external sensor 1 extends, and the reliability of detection decreases as the position of a deceleration object deviates in the lateral direction from the central axis of detection of the external sensor 1 (a center position in the width direction of a detection range).

Therefore, the reliability calculation unit 13 decreases the reliability of detection as a distance from the host vehicle to a deceleration object extends based on a positional relationship between the host vehicle and the deceleration object, detected by the deceleration object detection unit 11. The reliability calculation unit 13 decreases the reliability of detection as a deviation in the lateral position of a deceleration object relative to the host vehicle increases based on a positional relationship between the host vehicle and the deceleration object, detected by the deceleration object detection unit 11.

In this way, calculating a reliability of detection by the reliability calculation unit 13 based on a positional relationship between the host vehicle and a deceleration object includes decreasing the reliability of detection as a distance from the host vehicle to a deceleration object extends and decreasing the reliability of detection as a deviation in the lateral position of a deceleration object relative to the host vehicle increases.

Detection Reliability Calculation Method 2

As the detection reliability calculation method 2, the reliability calculation unit 13 is capable of calculating a reliability of detection based on a surrounding environment. The surrounding environment may be, for example, whether visibility ahead of the host vehicle (external sensor 1) is poor. When visibility ahead of the host vehicle (external sensor 1) is poor, the reliability of detection of a deceleration object using the external sensor 1 decreases as compared to when visibility is not poor.

For example, when there is fogging on a windshield in front of the external sensor 1, the external sensor 1 may be not able to accurately detect a deceleration object. Therefore, when there is fogging on the windshield in front of the external sensor 1, the reliability calculation unit 13 decreases the reliability of detection as compared to when there is no fogging. The reliability calculation unit 13 may determine whether there is fogging on the windshield based on, for example, the status of operation of a defroster that defrosts fogging on the windshield. When an occupant of the host vehicle activates the defroster, the reliability calculation unit 13 determines that there is fogging on the windshield. The reliability calculation unit 13 may determine whether there is fogging on the windshield based on an image captured by the camera provided as the external sensor 1. Specifically, for example, when there is fogging on the windshield, an edge of an object in an image captured by the camera may be not recognized properly (the edge becomes blurred). Therefore, for example, when an edge of an object in an image captured by the camera is not properly recognized, the reliability calculation unit 13 may determine that there is fogging on the windshield.

For example, when it is raining in an area where the host vehicle is running, visibility ahead of the host vehicle (external sensor 1) may be poor. Therefore, when it is raining in an area where the host vehicle is running, the reliability calculation unit 13 decreases the reliability of detection as compared to when it is not raining. The reliability calculation unit 13 is capable of determining whether it is raining based on, for example, the status of operation of a wiper, information detected by a rain sensor, a rain image recognition process performed based on an image captured by the camera, weather information around the host vehicle, acquired from a weather information center or the like, or other information. Other than when it is raining, the reliability calculation unit 13 may calculate a reliability of detection by determining whether forward visibility is poor based on weather (for example, snowing, fogging, or the like) other than raining.

For example, when the host vehicle is running against the sun, visibility ahead of the host vehicle (external sensor 1) may be poor. Therefore, when the host vehicle is running against the sun, the reliability calculation unit 13 decreases the reliability of detection as compared to when the host vehicle is not running against the sun. The reliability calculation unit 13 is capable of determining whether the host vehicle is running against the sun based on, for example, information on adjustment of the aperture of the camera provided as the external sensor 1, the degree of blown out highlights in an image captured by the camera, or the like.

For example, whether an environment is likely to increase error detection may be used as a surrounding environment to calculate a reliability of detection based on a surrounding environment. For example, when a large number of deceleration objects are detected by the deceleration object detection unit 11, error detection may increase because of inaccurate detection of each of the deceleration objects due to overlapping or the like of the deceleration objects when viewed from the host vehicle (external sensor 1). Therefore, when the number of deceleration objects recognized by the deceleration object detection unit 11 is large, the reliability calculation unit 13 decreases the reliability of detection as compared to when the number of deceleration objects is small.

For example, when a road on which the host vehicle is running is a complicated road environment, error detection may increase because of inaccurate detection of movement or the like of a deceleration object. Examples of the complicated road environment include an intersection at which multiple roads intersect, and a steep-gradient road. The reliability calculation unit 13 may acquire whether a road on which the host vehicle is running is a complicated road environment based on, for example, map information of a navigation system, or the like. When a road on which the host vehicle is running is a complicated road environment, the reliability calculation unit 13 decreases the reliability of detection as compared to when the road is not a complicated road environment.

Detection Reliability Calculation Method 3

As the detection reliability calculation method 3, the reliability calculation unit 13 is capable of calculating a reliability of detection based on an image recognition likelihood of a deceleration object, detected by the deceleration object detection unit 11 based on a captured image of the camera (external sensor 1). An image recognition likelihood indicates a likelihood of recognition of a deceleration object that is recognized based on a captured image. The deceleration object detection unit 11 detects a deceleration object based on an image captured by the camera as described above and also obtains an image recognition likelihood of the deceleration object.

For example, when the definition of a captured image is high, the deceleration object detection unit 11 may increase an image recognition likelihood as compared to when the definition is low. The deceleration object detection unit 11 may obtain an image recognition likelihood based on, for example, a degree of image pattern match at the time when a deceleration object is detected by means of pattern matching. A degree of image pattern match indicates a degree of match between an image captured by the camera and a predetermined image pattern. When the degree of image pattern match is high, the deceleration object detection unit 11 increases the image recognition likelihood of a deceleration object as compared to when the degree of image pattern match is low.

Figure 2A:
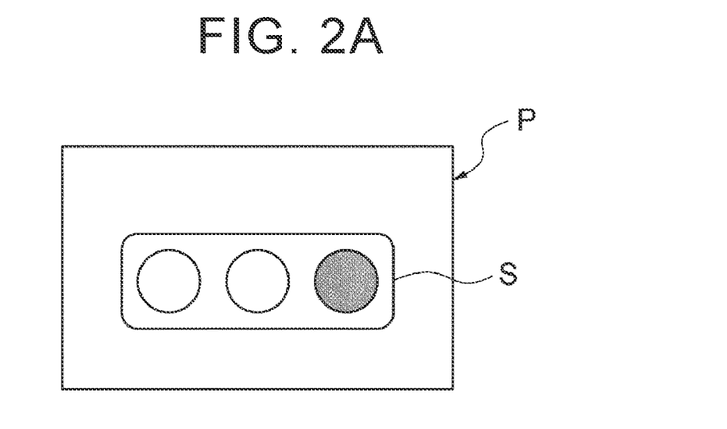
FIG. 2A is a view showing an example of an image pattern of a traffic light, which is used in pattern matching.

Here, a specific example in the case where the deceleration object detection unit 11 recognizes a traffic light by means of pattern matching will be described. For example, as in the case of an image pattern P shown in FIG. 2A, the deceleration object detection unit 11 stores an image pattern of a traffic light in advance. The image pattern P contains a traffic light S. The image pattern P may be learned data or the like generated based on a captured image of a traffic light, captured in the past.

Figure 2B:
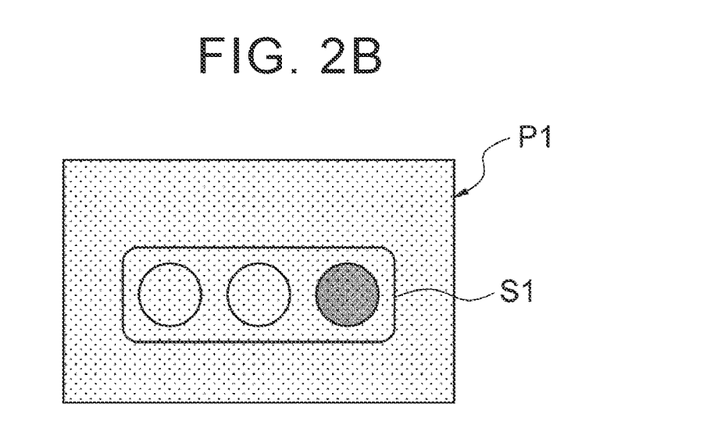
FIG. 2B is a view showing an example of an image of a traffic light, captured by a camera.
Figure 2C:
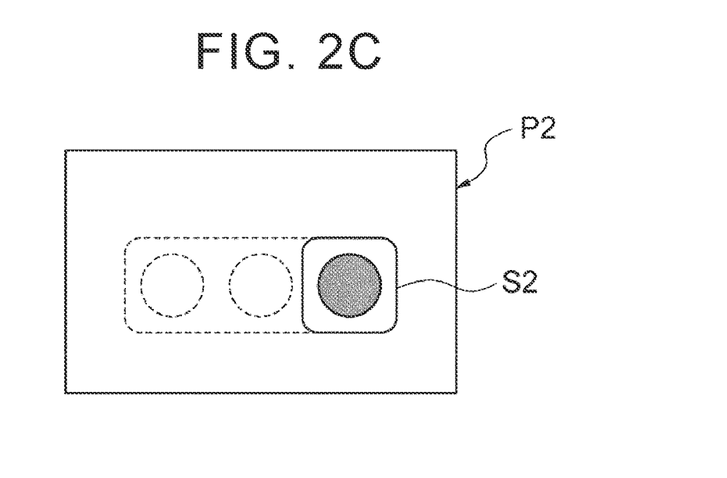
FIG. 2C is a view showing an example of an image of a traffic light, captured by the camera.

As shown in FIG. 2B and FIG. 2C, it is assumed that captured images P1, P2 of traffic lights are captured by the camera. In the captured image P1 shown in FIG. 2B, a traffic light S1 is slightly blurred because of rain, fog, or the like. Therefore, when the deceleration object detection unit 11 performs pattern matching by using the image pattern P and the captured image P1, the degree of image pattern match decreases as compared to when the captured image P1 is clear. In this case, the deceleration object detection unit 11 decreases an image recognition likelihood as compared to when the captured image is clear. In the captured image P2 shown in FIG. 2C, only the right end part of a traffic light S2 shows up when viewed from the host vehicle because of the influence of light, a screen object, or the like. Therefore, when the deceleration object detection unit 11 performs pattern matching by using the image pattern P and the captured image P2, the degree of image pattern match decreases as compared to when the entire traffic light S2 shows up. In this case, the deceleration object detection unit 11 decreases an image recognition likelihood as compared to when the entire traffic light S2 shows up. The deceleration object detection unit 11 may increase the degree of image pattern match of the traffic light that is recognized based on the captured image P1 shown in FIG. 2B as compared to the degree of image pattern match of the traffic light that is recognized based on the captured image P2 shown in FIG. 2C.

An image recognition likelihood of a deceleration object recognized based on an image captured by the camera may change depending on, for example, a surrounding environment of the host vehicle. The surrounding environment may include, as in the case of the above description in Detection Reliability Calculation Method 2, whether visibility ahead of the host vehicle is poor and whether an environment is likely to increase error detection. When visibility ahead of the host vehicle is poor, the deceleration object detection unit 11 decreases an image recognition likelihood of a deceleration object as compared to when visibility is not poor. When an environment is likely to increase error detection, the deceleration object detection unit 11 decreases an image recognition likelihood as compared to when an environment is not likely to increase error detection.

The reliability calculation unit 13 acquires the image recognition likelihood obtained by the deceleration object detection unit 11 and calculates a reliability of detection based on the acquired image recognition likelihood. When the image recognition likelihood is high, the reliability calculation unit 13 increases a reliability of detection as compared to when the image recognition likelihood is low.

In this way, the reliability calculation unit 13 is capable of calculating the reliability of detection of a deceleration object by using at least any one of the detection reliability calculation method 1, the detection reliability calculation method 2, and the detection reliability calculation method 3. In the present embodiment, when the deceleration object detected by the deceleration object detection unit 11 is a preceding vehicle, the reliability calculation unit 13 calculates a reliability of detection based on the detection reliability calculation method 1, of the detection reliability calculation method 1 and the detection reliability calculation method 3. In other words, when the deceleration object recognized by the deceleration object detection unit 11 is a preceding vehicle, the reliability calculation unit 13 calculates a reliability of detection based on the positional relationship between the host vehicle and the preceding vehicle. When the deceleration object is a preceding vehicle, the reliability calculation unit 13 may calculate a reliability of detection by using the detection reliability calculation method 2 in addition to the detection reliability calculation method 1.

In the present embodiment, when the deceleration object recognized by the deceleration object detection unit 11 is a traffic light, the reliability calculation unit 13 calculates a reliability of detection based on the detection reliability calculation method 3, of the detection reliability calculation method 1 and the detection reliability calculation method 3. In other words, when the deceleration object recognized by the deceleration object detection unit 11 is a traffic light, the reliability calculation unit 13 calculates a reliability of detection based on an image recognition likelihood of the traffic light that is recognized based on an image captured by the camera. When the deceleration object is a traffic light, the reliability calculation unit 13 may calculate a reliability of detection by using the detection reliability calculation method 2 in addition to the detection reliability calculation method 3.

The assistance mode selection unit 14 selects an assistance mode of deceleration assistance from among multiple assistance modes according to the reliability of detection calculated by the reliability calculation unit 13. Multiple assistance modes with different levels of deceleration assistance are set in advance as assistance modes of deceleration assistance. When the reliability of detection is high, the assistance mode selection unit 14 selects the assistance mode with a higher level of deceleration assistance as compared to when the reliability of detection is low.

Specifically, in the present embodiment, three assistance modes, that is, a high-reliability assistance mode (second assistance mode), an intermediate-reliability assistance mode (first assistance mode), and a low-reliability assistance mode, are included as the assistance modes of deceleration assistance. The high-reliability assistance mode is higher in the level of assistance than the intermediate-reliability assistance mode. The intermediate-reliability assistance mode is higher in the level of assistance than the low-reliability assistance mode. A higher degree of deceleration assistance may mean to provide a greater amount of assistance than a lower degree of deceleration assistance. A higher degree of deceleration assistance may mean to start deceleration assistance earlier than a lower degree of deceleration assistance.

Figure 3A:
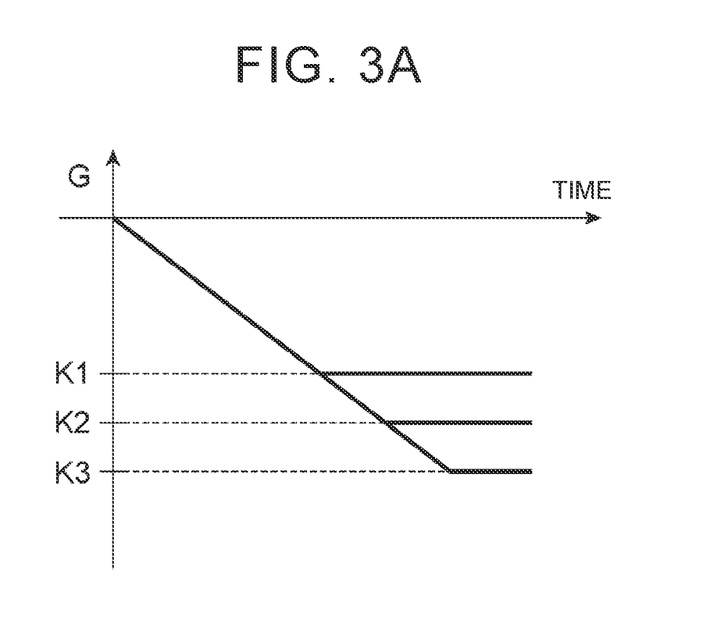
FIG. 3A is a graph showing temporal changes in G when a lower limit of G for deceleration assistance is changed.

Specifically, for example, the high-reliability assistance mode, the intermediate-reliability assistance mode, and the low-reliability assistance mode may respectively have different lower limits of G when the host vehicle is caused to decelerate under deceleration assistance. In this case, for example, as shown in FIG. 3A, K1 may be set as the lower limit of G in the low-reliability assistance mode, K2 may be set as the lower limit of G in the intermediate-reliability assistance mode, and K3 may be set as the lower limit of G in the high-reliability assistance mode. K1 is greater in value (less in absolute value) than K2, and K2 is greater in value (less in absolute value) than K3. In other words, the amount of deceleration assistance increases in order of the low-reliability assistance mode, the intermediate-reliability assistance mode, and the high-reliability assistance mode. In this way, multiple assistance modes of deceleration assistance may include assistance modes having different lower limits of G when the host vehicle is caused to decelerate.

Figure 3B:
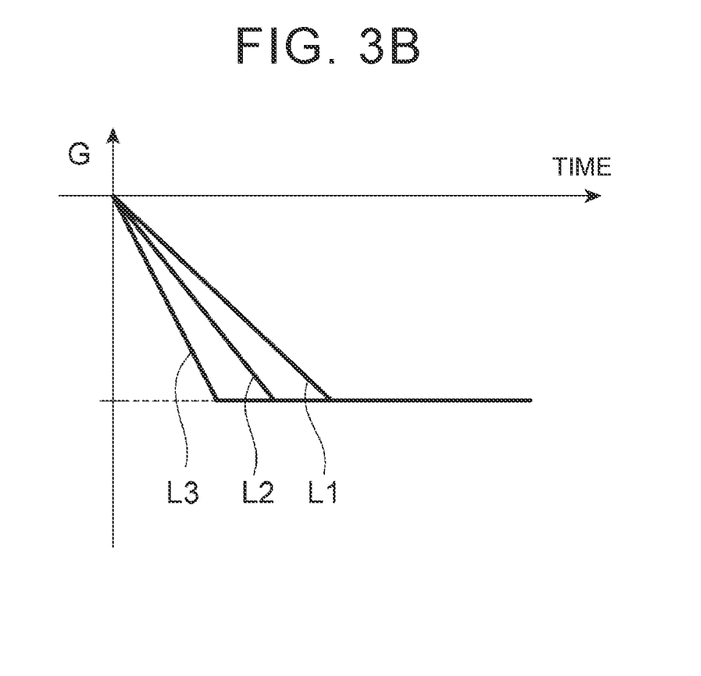
FIG. 3B is a graph showing temporal changes in G when a jerk for deceleration assistance is changed.

Specifically, for example, the high-reliability assistance mode, the intermediate-reliability assistance mode, and the low-reliability assistance mode may respectively have different jerks when the host vehicle is caused to decelerate under deceleration assistance. In this case, a jerk that is used in the high-reliability assistance mode is set so as to be greater than a jerk that is used in the intermediate-reliability assistance mode, and a jerk that is used in the intermediate-reliability assistance mode is set so as to be greater than a jerk that is used in the low-reliability assistance mode. Thus, for example, as shown by the graph L1, the graph L2, and the graph L3 that represent temporal changes in G in FIG. 3B, G changes like the graph L1 in the low-reliability assistance mode with a low jerk of deceleration, G changes like the graph L2 in the intermediate-reliability assistance mode with a medium jerk of deceleration, and G changes like the graph L3 in the high-reliability assistance mode with a high jerk of deceleration. Thus, as shown in FIG. 3B, a predetermined G value is reached in a shorter time in the high-reliability assistance mode than in the intermediate-reliability assistance mode, and a predetermined G value is reached in a shorter time in the intermediate-reliability assistance mode than in the low-reliability assistance mode. In other words, the amount of deceleration assistance increases in order of the low-reliability assistance mode, the intermediate-reliability assistance mode, and the high-reliability assistance mode. In this way, multiple assistance modes of deceleration assistance may include assistance modes having different jerks when the host vehicle is caused to decelerate to a predetermined G value.

Specifically, for example, the high-reliability assistance mode, the intermediate-reliability assistance mode, and the low-reliability assistance mode may respectively have different start timings to start deceleration assistance after the start condition determination unit 12 determines that the deceleration assistance start condition is satisfied. In other words, the start timing of deceleration assistance in the high-reliability assistance mode is earlier than the start timing of deceleration assistance in the intermediate-reliability assistance mode. The start timing of deceleration assistance in the intermediate-reliability assistance mode is earlier than the start timing of deceleration assistance in the low-reliability assistance mode. In this way, multiple assistance modes of deceleration assistance may include assistance modes having different start timings to start deceleration assistance after it is determined that the deceleration assistance start condition is satisfied.

The assistance modes, that is, the high-reliability assistance mode, the intermediate-reliability assistance mode, and the low-reliability assistance mode, all may be determined for each type of deceleration object (preceding vehicle, traffic light, pedestrian, or the like).

The assistance mode selection unit 14 selects an assistance mode according to a reliability of detection from among the high-reliability assistance mode, the intermediate-reliability assistance mode, and the low-reliability assistance mode. When the reliability of detection is higher than or equal to a predetermined second reliability threshold (reliability threshold), the assistance mode selection unit 14 selects the high-reliability assistance mode. When the reliability of detection is higher than or equal to a first reliability threshold and lower than the second reliability threshold, the assistance mode selection unit 14 selects the intermediate-reliability assistance mode. The second reliability threshold is higher in value than the first reliability threshold. When the reliability of detection is lower than the predetermined first reliability threshold, the assistance mode selection unit 14 selects the low-reliability assistance mode.

When the start condition determination unit 12 determines that the deceleration assistance start condition is satisfied, the driving support unit 15 performs deceleration assistance in the assistance mode selected by the assistance mode selection unit 14. The driving support unit 15 performs deceleration assistance for the host vehicle by transmitting a control signal to the actuator 3. The driving support unit 15 performs deceleration assistance to cause the host vehicle to decelerate to a preset target speed in accordance with the assistance mode selected by the assistance mode selection unit 14, based on, for example, a distance between the host vehicle and a deceleration object and the speed of the host vehicle.

Figure 4:
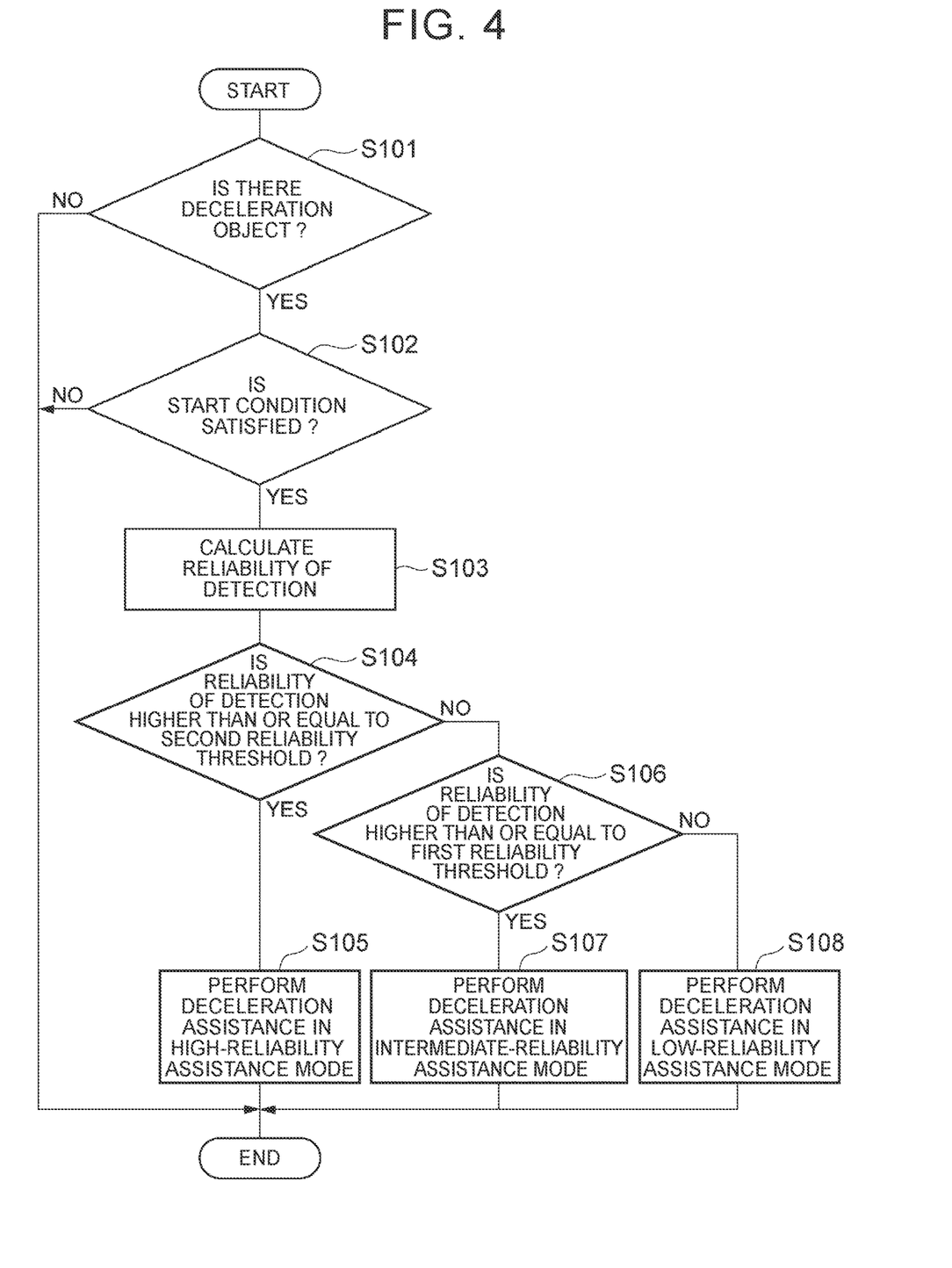
FIG. 4 is a flowchart showing the flow of a deceleration assistance process that is executed in the driving support system.

Next, the flow of a deceleration assistance process that is executed in the driving support system 100 will be described with reference to the flowchart of FIG. 4. The process shown in FIG. 4 is executed when the function of deceleration assistance of the host vehicle is active. The process shown in FIG. 4 is started again from S101 when the process reaches the end.

As shown in FIG. 4, the deceleration object detection unit 11 detects a deceleration object ahead of the host vehicle (S101). When no deceleration object is detected (NO in S101), the driving support ECU 10 ends the current process and starts the process from S101 again. When a deceleration object is detected (YES in S101), the start condition determination unit 12 determines whether the deceleration assistance start condition for a deceleration object is satisfied (S102). When the deceleration assistance start condition is not satisfied (NO in S102), the driving support ECU 10 ends the current process and starts the process from S101 again.

When the deceleration assistance start condition is satisfied (YES in S102), the reliability calculation unit 13 calculates the reliability of detection of the deceleration object (S103). The assistance mode selection unit 14 determines whether the calculated reliability of detection is higher than or equal to the second reliability threshold (S104). When the reliability of detection is higher than or equal to the second reliability threshold (YES in S104), the assistance mode selection unit 14 selects the high-reliability assistance mode. Then, the driving support unit 15 performs deceleration assistance for the host vehicle in the high-reliability assistance mode (S105).

When the reliability of detection is not higher than or equal to the second reliability threshold (NO in S104), the assistance mode selection unit 14 determines whether the reliability of detection is higher than or equal to the first reliability threshold (S106). When the reliability of detection is higher than or equal to the first reliability threshold (YES in S106), the assistance mode selection unit 14 selects the intermediate-reliability assistance mode. Then, the driving support unit 15 performs deceleration assistance for the host vehicle in the intermediate-reliability assistance mode (S107).

When the reliability of detection is not higher than or equal to the first reliability threshold (NO in S106), the assistance mode selection unit 14 selects the low-reliability assistance mode. Then, the driving support unit 15 performs deceleration assistance for the host vehicle in the low-reliability assistance mode (S108).

As described above, in the driving support system 100, deceleration assistance in the high-reliability assistance mode with a high level of deceleration assistance is performed when the reliability of detection is higher than or equal to the second reliability threshold, deceleration assistance in the intermediate-reliability assistance mode with a medium level of deceleration assistance is performed when the reliability of detection is lower than the second reliability threshold and higher than or equal to the first reliability threshold, and deceleration assistance in the low-reliability assistance mode with a low level of deceleration assistance is performed when the reliability of detection is lower than the first reliability threshold. In this way, the driving support system 100 is capable of performing further reliable deceleration assistance higher in the level of deceleration assistance when the reliability of detection is high. As described above, the driving support system 100 is capable of performing appropriate deceleration assistance in consideration of the reliability of detection of a deceleration object.

When the reliability calculation unit 13 calculates a reliability of detection based on a positional relationship between the host vehicle and a deceleration object, the reliability calculation unit 13 decreases the reliability of detection as a distance from the host vehicle to the deceleration object extends, and decreases the reliability of detection as a deviation in the lateral position of the deceleration object relative to the host vehicle increases. In this case, the driving support system 100 is capable of further appropriately calculating a reliability of detection in consideration of the detection capability of the external sensor 1 that detects a deceleration object.

When the deceleration object is a preceding vehicle, the reliability calculation unit 13 calculates a reliability of detection base on a positional relationship between the host vehicle and the deceleration object. When the deceleration object is a traffic light, the reliability calculation unit 13 calculates a reliability of detection based on an image recognition likelihood of the traffic light, recognized based on a captured image. For example, a preceding vehicle is running on a road ahead of the host vehicle, while a traffic light is provided on a road ahead of the host vehicle or provided at a roadside. Therefore, the driving support system 100 calculates a reliability of detection based on a positional relationship between the host vehicle and a deceleration object when the deceleration object is a preceding vehicle and calculates a reliability of detection based on an image recognition likelihood when the deceleration object is a traffic light. Therefore, the driving support system is capable of further appropriately calculating the reliability of detection in accordance with a type of deceleration object.

The embodiment of the disclosure is described above; however, the disclosure is not limited to the above embodiment. For example, in the above-described embodiment, an example in which assistance modes of deceleration assistance include three assistance modes, that is, the high-reliability assistance mode, the intermediate-reliability assistance mode, and the low-reliability assistance mode, is described. However, the number of assistance modes of deceleration assistance is not limited to three and it may be enough to include at least two or more assistance modes with different levels of deceleration assistance. In this case as well, it may be better that the driving support system 100 selects an assistance mode with a higher level of assistance as the reliability of detection increases and performs deceleration assistance in the selected assistance mode.

When the reliability calculation unit 13 calculates a reliability of detection based on a positional relationship between the host vehicle and a deceleration object, the reliability calculation unit 13 may be configured to use at least any one of decreasing the reliability of detection as a distance from the host vehicle to the deceleration object extends and decreasing the reliability of detection as a deviation in the lateral position of the deceleration object relative to the host vehicle increases.

In the above embodiment, an example in which the reliability calculation unit 13 calculates a reliability of detection based on a positional relationship between the host vehicle and a deceleration object when the deceleration object is a preceding vehicle and calculates a reliability of detection based on an image recognition likelihood when the deceleration object is a traffic light is described. However, the reliability calculation unit 13 may be configured not to use different detection reliability calculation methods for the case where the deceleration object is a preceding vehicle and the case where the deceleration object is a traffic light.

As shown in FIG. 4, the start condition determination unit 12 determines whether the deceleration assistance start condition intended for a deceleration object is satisfied (S102) before the process of calculating a reliability of detection (S103). However, the process of determining whether the deceleration assistance start condition is satisfied is not limited to the above-described timing shown in FIG. 4. For example, after the assistance mode selection unit 14 selects an assistance mode to be used based on a reliability of detection, the start condition determination unit 12 may determine whether the deceleration assistance start condition is satisfied. The process in which the assistance mode selection unit 14 selects an assistance mode and the process in which the start condition determination unit 12 determines whether the deceleration assistance start condition is satisfied may be executed in parallel. In this case, the assistance mode selection unit 14 selects an assistance mode to be used based on the reliability of detection. Then, it may be enough that, when the start condition determination unit 12 determines that the deceleration assistance start condition is satisfied, the driving support unit 15 performs deceleration assistance in the assistance mode selected by the assistance mode selection unit 14.

At least part of the above-described embodiment and various modifications may be combined optionally.

What is claimed is:

1. A driving support system that detects a deceleration object ahead of a host vehicle and that starts deceleration assistance for the host vehicle based on at least a distance between the detected deceleration object and the host vehicle, the driving support system comprising:
a reliability calculation unit configured to calculate a reliability of detection of the deceleration object;
an assistance mode selection unit configured to select an assistance mode of the deceleration assistance from among multiple assistance modes in accordance with the calculated reliability of detection; and
a driving support unit configured to perform the deceleration assistance in the selected assistance mode, wherein:
the multiple assistance modes include a first assistance mode and a second assistance mode higher in a level of the deceleration assistance than the first assistance mode; and
the assistance mode selection unit is configured to select the first assistance mode when the reliability of detection is lower than a predetermined reliability threshold and select the second assistance mode when the reliability of detection is higher than or equal to the reliability threshold.

2. The driving support system according to claim 1, wherein:

the reliability calculation unit is configured to calculate the reliability of detection based on a positional relationship between the host vehicle and the deceleration object; and
calculating the reliability of detection based on the positional relationship by the reliability calculation unit includes at least one of decreasing the reliability of detection as a distance from the host vehicle to the deceleration object extends and decreasing the reliability of detection as a deviation of a lateral position of the deceleration object relative to the host vehicle increases.

3. The driving support system according to claim 2, wherein:
the reliability calculation unit is configured to, when the deceleration object is a preceding vehicle, calculate the reliability of detection based on the positional relationship between the host vehicle and the deceleration object; and
the reliability calculation unit is configured to, when the deceleration object is a traffic light, calculate the reliability of detection based on an image recognition likelihood of the traffic light, recognized based on a captured image.

4. A driving support system that detects a deceleration object ahead of a host vehicle and that starts deceleration assistance for the host vehicle based on at least a distance between the detected deceleration object and the host vehicle, the driving support system comprising:
an electronic control unit (ECU) including a processor programmed to:
calculate a reliability of detection of the deceleration object;
select an assistance mode of the deceleration assistance from among multiple assistance modes in accordance with the calculated reliability of detection;
perform the deceleration assistance in the selected assistance mode, wherein the multiple assistance modes include a first assistance mode and a second assistance mode higher in a level of the deceleration assistance than the first assistance mode; and
select the first assistance mode when the reliability of detection is lower than a predetermined reliability threshold and select the second assistance mode when the reliability of detection is higher than or equal to the reliability threshold.

5. The driving support system according to claim 4, wherein the ECU is further programmed to:
calculate the reliability of detection based on a positional relationship between the host vehicle and the deceleration object, wherein the reliability of detection decreases as (i) a distance from the host vehicle to the deceleration object extends, and (ii) a deviation of a lateral position of the deceleration object relative to the host vehicle increases.

6. The driving support system according to claim 5, wherein:
when the deceleration object is a preceding vehicle, the reliability of detection is calculated based on the positional relationship between the host vehicle and the deceleration object; and
when the deceleration object is a traffic light, the reliability of detection is calculated based on an image recognition likelihood of the traffic light, recognized based on a captured image.

* * * * *